May 17, 1966  C. B. VOGEL  3,252,131
METHOD OF ACOUSTIC WELL LOGGING THAT RETAINS CHARACTERISTICS
OF LATER ARRIVING WAVES
Filed Sept. 10, 1962  3 Sheets-Sheet 2

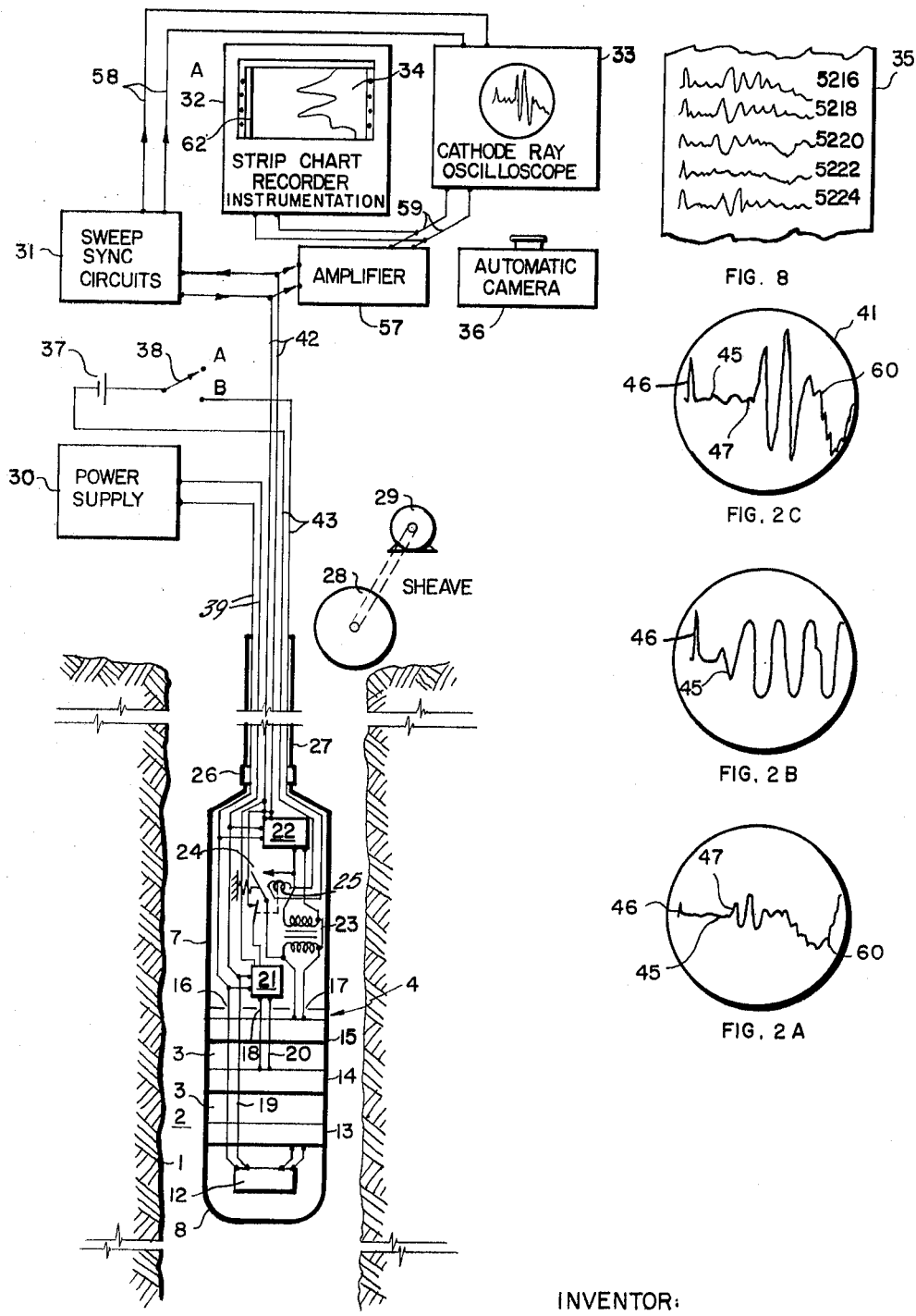

INVENTOR:
C. B. VOGEL
BY: Theodore E. Bieber
HIS ATTORNEY

May 17, 1966 C. B. VOGEL 3,252,131
METHOD OF ACOUSTIC WELL LOGGING THAT RETAINS CHARACTERISTICS
OF LATER ARRIVING WAVES
Filed Sept. 10, 1962 3 Sheets-Sheet 3
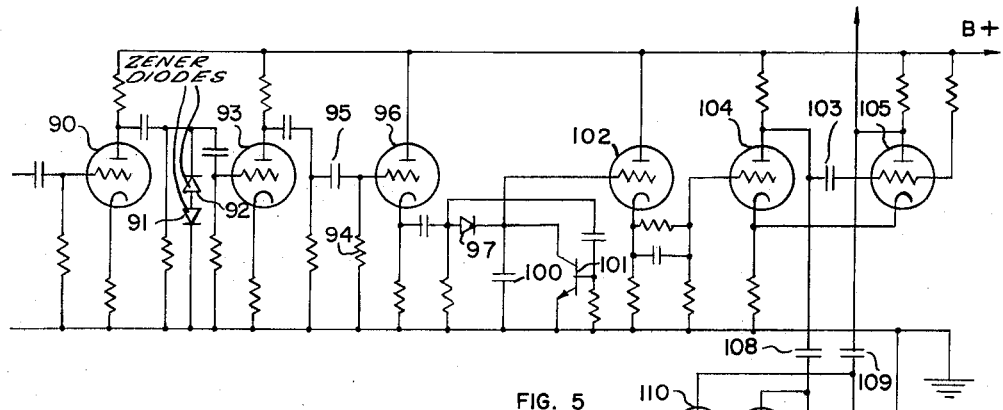
FIG. 5
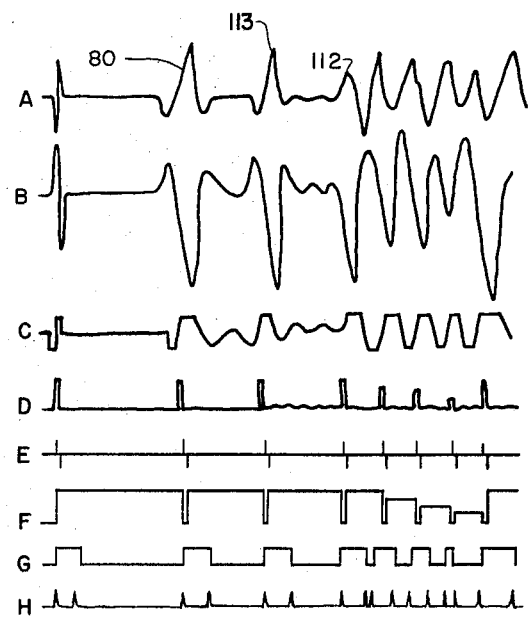
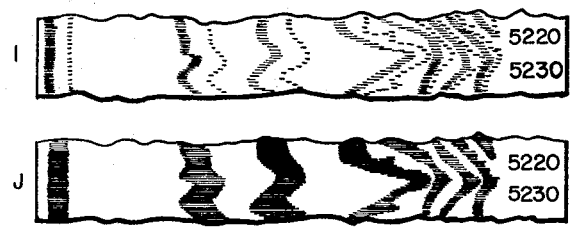
FIG. 6
INVENTOR:
C. B. VOGEL
BY
HIS ATTORNEY

United States Patent Office 3,252,131
Patented May 17, 1966

3,252,131
METHOD OF ACOUSTIC WELL LOGGING THAT RETAINS CHARACTERISTICS OF LATER ARRIVING WAVES
Charles B. Vogel, Houston, Tex., assignor to Shell Oil Company, New York, N.Y., a corporation of Delaware
Filed Sept. 10, 1962, Ser. No. 222,271
3 Claims. (Cl. 340—18)

This invention pertains to acoustical well logging and particularly to characterizing earth formations by recording in the same borehole the response of the formation to waves of at least two different velocities, these waves being selectively and preferentially recorded in a correlatable manner.

The present practice in the art of acoustic logging involves in general, measurement of the response of the formation of the rocks surrounding the borehole to compressional waves of sound. These waves in general are those which travel from a transmitter and are the first to arrive at a receiver spaced therefrom. It is known that other acoustic properties of the borehole also vary in a manner useful for characterizing formations.

It will be useful at this point to describe the various waves that are propagated within a borehole when an acoustical wave is created therein. If a receiver is positioned at a moderate distance, for example, a few feet vertically from a sound source, there will first arrive at the receiver relatively small amplitude waves that travel from the transmitter through the mud, vertically through the borehole formation with the velocity of compression waves, then back through the mud to the receiver. Somewhat later, there will arrive at the receiver a second wave which will hereinafter be called a shear wave that travels near the surface of the borehole but travels at the velocity approximately equal to that of shear waves in an infinite body of rock with the same properties. Next there arrives at the receiver a wave that travels directly through the mud and is generally a high frequency wave and is usually not recorded because the frequency is too high to be transmitted with reasonable amplitude over the well logging cables used. Following this direct or fluid wave there arrives a wave which is usually termed a "tube wave." This wave is very large in amplitude, sometimes being for example 10 to 100 times the amplitude of the compressional wave. This wave travels with a very low velocity, lower than that of the fluid within the borehole, and generally has a very low frequency. For example, the frequency of the compressional and shear wave would generally be between 10,000 and 20,000 cycles per second, whereas the frequency of this third wave would generally be below 5,000 cycles per second.

There are also other waves reaching the receiver at times intermediate between the arrivals of the ones just described. These waves represent compressional and shear waves which have traveled not only up the vertical length of the borehole formation between the transmitter and receiver but also across the diameter of the borehole. Thus, these waves will have arrival times that are controlled not only by the velocity of the formation and of the fluid in the borehole but also by the diameter of the borehole. It has been found that the variation of the arrival time of shear waves as above-described varies more with variation of rock formation properties than does the arrival time of compressional waves. It is, accordingly, useful in measuring the velocity variation in very high speed formations to measure not only the variation of the compressional wave but also that of the shear wave, this latter variation being greater and hence capable of greater relative precision in measurement. Also, the shear wave is useful for logging the variation of acoustic properties of rocks having a very high compressional wave velocity, since in these rocks the compressional wave amplitude is often very small as contrasted with the much larger amplitude of the shear wave. Furthermore, since the tube and the shear wave are to a substantial degree propagated along the surface of the borehole and with velocity and amplitude which vary in part as a function of the condition of the surface, recording the amplitude and/or velocity of these waves is particularly useful for determining the conditions of bonding that exists between casing and cement or between cement and formation where pipe is cemented in the borehole. Thus, these waves may be used not only to measure variations in the properties of formations surrounding the borehole, but also variations of the quality of the cementing job where pipe is set within the borehole.

Furthermore, these waves, which are in all cases slower than compressional waves, may be used to determine with great precision the depth at which there exists an interface between two layers having contrasting acoustical properties. This is done by finding at which depth these surface-type waves are reflected, these reflections in turn being observed on full oscillographic recordings of the waves. The use of surface waves is especially advantageous for detecting and locating layering by means of reflections, since these waves, being confined substantially to the surface of the borehole, are affected by layering only where the layers intersect the borehole wall. Thus the confusion resulting from a great multiplicity of overlapping reflections originating away from the borehole is avoided in the recording. It has also been learned that the propagation of shear and tube waves transmitted vertically through the formation is sensitive to the presence of fractures within the earth and therefore the measurement of the amplitude and/or velocity of these waves may be used to determine the presence of fractures. Recording compressional, shear, and tube wave velocities provides a method of indirectly measuring the compressibility, density, and rigidity of earth materials, since the tube wave velocity is controlled by the rigidity of the earth material logged, the velocity and density of the borehole fluid being relatively constant and separately determinable whereas the shear wave velocity is controlled by the ratio of the rigidity to the density for earth materials logged; and the compressional wave velocity is a function of compressibility, density, and rigidity. Thus, by separately measuring the compressional, shear, and tube wave velocities one may determine the compressibility, density, and rigidity of earth materials logged by substituting quantities determined from log measurements into the following equations:

$$V_T = V_w^2 \mu (\mu + \rho_w^2 V_w^2)$$

and $$V_S^2 = \mu/\rho \text{ and } V_L = \frac{3 + 4\mu C}{3\rho C}$$

where $V_L$ is compression wave velocity; $V_T$ is tube wave velocity; $V_S$ is shear wave velocity; $\mu$ is formation rigidity; $\rho$ is formation density; $C$ is formation compressibility; $V_w$ is well fluid velocity; $\rho_w$ is well fluid density.

Accordingly, the principal object of the present invention is to provide a new and unique method of logging wherein there is recorded in the same borehole a record of the compressional wave velocity selectively recorded, preferably in the form of a strip chart linegraph and also slower waves such as the shear waves selectively recorded preferably in the form of an oscillograph record in a correlatable manner so that measurements made at the same depth may be compared and so that the faithful recording of the slower waves may be verified by the compression wave log.

A further object of this invention is to record the characteristics of compressional and shear waves and/or tube waves by recording first at high amplification and, secondly, at a very low amplification.

A further object of this invention is to record first with a very high gain and high pass filter to indicate the velocity and/or amplitude of compressional waves and then to record with low amplification and with a low pass filter for selectively recording the velocity, amplitude, and other characteristics of tube waves which have a frequency of below 5 kilocycles.

A still further object of this invention is to simultaneously record automatically in the same borehole and during the same traverse thereof with both high amplification for the compressional waves and low amplification for the slower waves.

A still further object of this invention is to preferentially record waves which arrive later than the direct fluid wave by gating off those waves traveling or arriving earlier than a preselected time following generation of the transmitted wave.

Another object of this invention is to accurately locate bed boundaries by oscillographically recording reflections of surface type waves produced at the intersections of the layers with the borehole wall.

The objects of this invention can be achieved depending upon the particular wave one desires to obtain by the following methods: First, if one desires to obtain a recording of the shear wave, one could first obtain a recording of the compressional wave and then obtain a second recording at a reduced amplitude. The amplitude being reduced sufficiently to substantially eliminate the compression wave while preserving the shear wave. A second method of obtaining a recording of the shear waves is to gate the receiver signal timewise to substantially eliminate the time period during which compressional waves are received, thus preserving the shear wave. The third method one could use would be a low frequency filter that would substantially eliminate both the compressional waves and shear waves which have substantially the same high frequency, while preserving the low frequency tube waves. One can combine the above three methods either simultaneously or sequentially to obtain recordings of any of the desired waves.

The above objects and advantages of this invention will be more easily understood from the following detailed description of preferred embodiments when taken in conjunction with the attached drawings, in which:

FIGURE 1 illustrates in block form a logging tool capable of performing the method of this invention;

FIGURES 2A–2C are a series of wave forms illustrating the signals that appear in various portions of the tool shown in FIGURE 1;

FIGURE 5 illustrates in schematic form a circuit for performing the method of this invention;

FIGURE 6 illustrates a series of wave forms and records obtained by use of the circuit shown in FIG 5;

Figure 3:
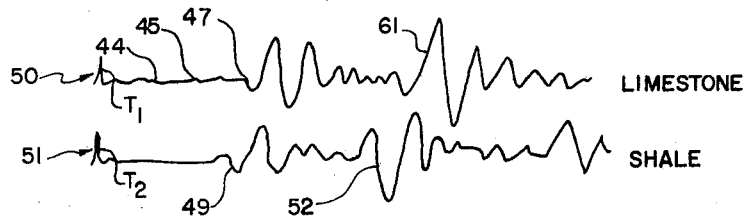
FIGURE 3 is a series of wave forms illustrating the type of signals received in various formations.

Referring now to FIGURE 1, there is shown in block form one embodiment of an apparatus for practicing the method of the present invention. The downhole tool 4 is lowered into the borehole 1 that is filled with drilling mud 2. The downhole tool 4 comprises link members 3, an instrumentation housing 7, transmitting transducer 13, receiving transducers 14 and 15, transmitter exciter or pulser 12, and instrument housing 8. The instrument housing 7 has a switching amplifier 21 and an amplifier 22 disposed therein. The switching amplifier 21 is more completely described and claimed in my copending application, Serial No. 745,351, filed June 30, 1958, now Patent No. 3,062,314. Receiver transducer 15 is connected to amplifier 22 by means of a transformer 23 that may either be in the circuit or effectively eliminated from the circuit by means of a relay 24. When the contacts of relay 24 are energized the relay will short out one of the terminals of the primary side of the transformer 23 to one of the terminals of the secondary side of transformer 23. The coil for energizing relay 24 is connected to a pair of conductors 43 which are run to the surface of the earth. The other primary terminal of transformer 23 is connected directly to the other secondary terminal of the transformer 23. FIGURE 2A shows the wave form of the signal received by receiving transducer 15. This wave form consists of a transmitting time break 46, an initially arriving compressional wave energy 45 which is of small amplitude, a later arriving shear wave energy 47 which is of substantially larger amplitude and of tube wave energy 60 which is of very large amplitude and very low frequency.

The link member 3 is constructed of a tension-bearing member embedded in a resilient material as described and claimed in a copending application of C. B. Vogel and T. W. Lamb, Serial No. 705,352, filed December 26, 1957, entitled "Coupling for Transducers in Well Logging Apparatus," now Patent No. 3,028,866. This type of link structure is desired since acoustic energy traveling through this link structure rather than being merely delayed as is common practice with most coupling links, is dissipated so that it dies down after leaving the transmitter and before it reaches the receiving transducers. The electric connections contained in the downhole tool pass out of a pressure type fitting 26 through a cable 27 to the surface. At the surface, conductor pair 43 is connected to a battery 37 and a switch 38 with switch 38 being used to operate the relay 24 in the downhole tool thereby greatly reducing the amplification of the signal produced by transducer 15. FIGURE 2B shows the wave form of the signal transmitted to conductor pair 42 by the amplifier 22. This is a greatly magnified and distorted form of the transducer signal as illustrated in FIGURE 2A. The signal in FIGURE 2B is amplified so much that the signal amplitude is limited by overloading of the amplifier 22. Thus, we see at 45 the compressional wave which is initially of relatively small amplitude and builds up to a relatively large amplitude because of amplification and maintains this relatively large and constant amplitude due to the overloading of the amplifier 22. The conductor pair 39 is connected to a power supply at the surface and the amplifiers and other electronic components in the downhole tool. The amplifier 21 in the downhole tool is shown without circuit means for transmitting signals to the surface for the purpose of simplifying the description of the present invention. Amplifier 21 is of the switching type described in my copending Patent No. 3,062,314. The output of switching amplifier 21 is normally connected to conductor pair 42 through a set of relay contacts, controlled by the coil 25, so that the output of switching amplifer 21 is disconnected when this relay coil 25 is energized. Thus simultaneously one can obtain a two receiver log or a character log by alternately energizing and not energizing coil 25. This permits one to practice a very simple operation by recording only the signals from the farthermost receiving transducer 15 to obtain a character log, while using signals from one or both receivers to obtain a normal velocity log. Of course, it is possible to couple the amplifier 21 to the surface through an extra pair of conductors so that the output of amplifier 21 may produce on the strip chart record 34 an independent velocity log.

The signals on conductor pair 42 are transmitted to amplifier 57 where they are amplified and then transmitted through conductor pair 59 to a cathode ray oscilloscope 33 where they are displayed on the face of the tube. Also, the signals from conductor pair 42 are transmitted to a sweep synchronization circuit 31 wherein there is produced a monotonically increasing wave of voltage transmitted by means of conductor pair 58 to the cathode ray oscilloscope to produce a horizontal sweep with a known time rate of movement. Also, the signals from conductor pair 42 are transmitted to strip chart recorder instrumentation 32 wherein by means of digital, monotonic voltage variation, or other suitable circuits there is produced by a graphic recorder, for example a pen recorder, on strip chart 62 a record trace 34. For example, strip chart recorder instrumentation 32 may be of the type illustrated by block diagram in the copending application Serial No. 836,303 filed August 26, 1959. The operation of the strip chart instrumentation 32 is such that the horizontal deflections of the trace from a reference line on the left hand edge of the record is proportional to the time intervening between two signals on conductor pair 42, such as those produced respectively by the transmitter and a receiver, as at 45 and 46 in FIGURE 2B, or produced respectively by two receivers. These signals must, of course, exceed a threshold level predetermined by the sensitivity of the recorder instrumentation. Thus, the travel time of the compressional waves which is a reciprocal of the velocity of the formation is recorded on the strip chart. The cable 27 passes over a sheave 28 or other measuring device which is connected to a syncho-transmitter 29. This synchro-transmitter 29 in turn is electrically connected or mechanically connected to the chart drive of chart recorder 32 so that there is produced on the strip chart a depth scale that bears a fixed relationship to the vertical motion of the downhole tool in the borehole.

In Figure 2C there is diagrammatically illustrated the wave form that appears on the output of amplifier 22 when relay 24 is energized. Under these conditions the amplifications of the voltage by means of transformer 23 that is normally approximately 30 times is eliminated from the circuit thereby reducing the amplification of the entire system by approximately 30 times. Thus in FIGURE 2C the initially arriving compressional wave 45 is greatly reduced in amplitude so as to become almost imperceptible whereas the slower arriving shear wave 47 and tube wave 60 are now clearly observed. These waves are recorded by means of cathode ray oscilloscope 33 that is adjusted for the condition when relay 24 is engerized to record the complete wave.

In Figure 8, we see an illustration 35 of a film recording made by an automatic camera 36 of the oscillogram traces appearing on oscilloscope 33 showing thereon the transmitter time break transient and the arrival signals produced by the slow waves such as the shear wave 47 of FIGURE 2C. This recording shows only a barely perceptible deflection due to small remaining signals of the compressional wave immediately following the time break transient.

It should be pointed out that the main feature of the system illustrated in FIGURE 1 is that there is recorded a strip chart line graph record responsive to the first arriving signals after these have been greatly amplified and a second recording is made of the response to slower signals such as shear waves. The reason for making this double recording is illustrated in FIGURE 3 where a trace 50 corresponds to signals that are observed in limestone. Trace 51 is a trace of the signal of the type observed in shale. On trace 50 we see at a time break transient $T_1$, barely perceptible deflections 44, caused by noise, a very small signal 45 produced by compressional wave signals, a relatively large signal 46 that is produced by the arrival of the shear wave and a later arriving signal 61 probably produced by a sound wave that has traveled along the borehole with compressional or shear wave velocity and has been deayed by being transmitted across the borehole through the mud. On normal recordings as shown in FIG. 3 that are transmitted over conventional well logging cables and systems that use normal amplifiers the tube wave does not appear because most amplifiers used in conventional acoustic logging systems are purposely made to discriminate against low frequencies because of the fact that noise produced by motion of the instrument in the borehole is of a low frequency and it is desirable to eliminate this from the records. Even though the noise is of low frequency its signal strength is often larger than the signals from the weak first arriving compressional waves. The trace 51 shows a time break transient $T_2$ a compressional wave 49 as observed in shale, a delayed compressional wave 52 that represents the wave which traveled along the borehole vertically with compressional wave velocity and has been delayed by horizontal travel through the borehole fluid. The two traces 50 and 51 are of very similar appearance. Thus, if one were to make a record only at reduced amplification to preferentially record shear waves it would be easy to confuse large amplitude shear waves that occur in limestone with a relatively large amplitude compressional wave that would be the first arrival in the case of shale. The compressional wave in the case of shale would have approximately the same amplitude as would the shear waves in the case of limestone. It is in order to eliminate the possibility of making incorrect conclusions it is important to record not only the low amplification records but to simultaneously or subsequently in the same borehole and in a correlatable manner to record at high amplification first arriving compressional waves by themselves. Although the second recording is preferably oscillographic, it may be made by means of strip chart recorder instrumentation 32 when coil 23 is energized. Under this condition the compressional wave signals on conductor pair 42 are below the threshold level of recorder instrumentation 32, whereas the slow waves, as at 47 in FIGURE 2C, retain a sufficiently large amplitude to actuate said recorder instrumentation.

Figure 4:
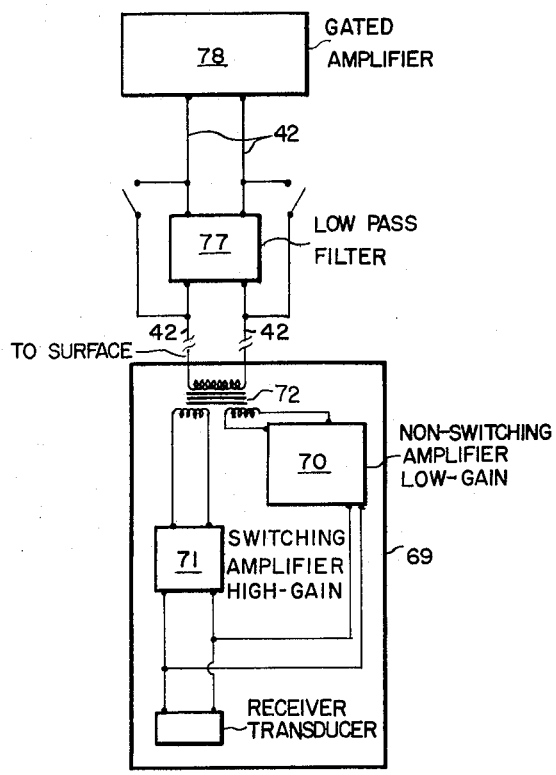
FIGURE 4 illustrates a modified form of downhole tool and surface recording system for use in practicing this invention.

With reference now to FIGURES 4, 5 and 6 there is here illustrated diagrammatically an alternative embodiment of the invention which has features that provide added convenience for the recording of the traces produced by the oscillograph and has the added feature of simultaneously recording several types of information.

Referring to FIGURE 4, we see a diagrammatic illustration of modifications required in the instrumentation of FIGURE 1 for this alternative embodiment of the invention. A gain switching circuit 69 is shown, for incorporation into the downhole tool 4 of FIGURE 1. This gain switching circuit 69 replaces amplifier 22 of FIGURE 1 in this alternative embodiment. The output of gain switching circuit 69 is connected to the conductor pair 42 of FIGURE 1, in parallel with the output of amplifier 21, which is also connected to conductor pair 42 as described above with reference to FIGURE 1. Also, the switching amplifier is adjusted to switch off after the second half cycle of the compressional wave has reached a substantial amplitude. The gain switching circuit 69 contains two amplifiers, one of which is a conventional rather low gain amplifier 70 having an amplification, for example 10 times, and a broad pass band and another amplifier 71 which has a gain of approximately 300 times. The amplifier 71 is of the switching type described in my copending Patent No. 3,062,314. For use here this switching amplifier is adjusted to switch off when the second half cycle of the compressional wave has reached a relatively substantial amplitude. As shown in FIGURE 4, the outputs of the two amplifiers 70 and 71 are connected essentially in parallel by means of a transformer 72 to the conductors which transmit the signals to the surface.

Figure 7:
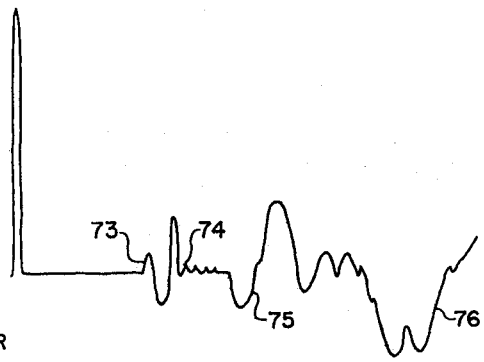
FIGURE 7 is a wave form of the signal produced by the instruments of FIGURE 4; and, FIGURE 8 is a portion of a film strip illustrating the recording of the oscilloscope signals.

In FIGURE 7 there is a diagram showing the wave form of signals received at the surface from this gain switching circuit 69. These signals consist first of a highly amplified compressional wave arrival 73 which is of large amplitude and is switched off at a time marked 74. Following this time interval we see the arrival of a shear wave 75 which is of relatively large amplitude even though it passes only through the normal low gain amplifier 70 and the last arriving signal is a tube wave 76 of low frequency and very large amplitude.

Referring again to FIGURE 4, there is illustrated diagrammatically several modifications in the surface recording instrumentation of FIGURE 1, for the alternative embodiment of the invention. The amplifier 57 of FIGURE 1 is replaced in this alternative embodiment by gated amplifier 78 of FIGURE 4. Furthermore, in the alternative embodiment, there is interposed between the surface terminals of conductor pair 42 and the input of gated amplifier 78 a low pass filter 77. The signals first pass through a low pass filter 77 having cut off frequency of approximately 5 kilocycles. This filter is coupled in the circuit so that it may be inserted in the circuit or effectively removed from the circuit. The signals after passing through the filter pass into the gated amplifier 78. The amplifier 78 has its output terminals connected to the strip chart recording instrumentation and to an oscillographic recording instrumentation shown in FIGURE 1. Gated amplifier 78 is of the type described in copending Patent No. 3,062,314 with the constants of the circuit adjusted so that it is relatively insensitive and will switch only on the large amplitude transmitter signal transient which in this case is made to be larger than any other signal received from the downhole instrument. The time constant of this switching amplifier for this application is made to be equal to a time interval equal to $S/V$ where S is the distance from the transmitter to the receiver being gated and V is equal to the velocity of sound in the drilling mud. Normally, $S/V$ is equal to 200 microseconds. Of course, other gating mechanisms can be used. The essential thing is that this gate circuit be arranged so that it turns off on production of the transmitter signal and then will not transmit any signals until after some predetermined time interval, preferably the time interval being set equal to $S/V$ described above. This amplifier is preferably so constructed that the switching off operation may be disabled at will.

The use of the gate circuit allows the recording instrumentation to respond only to the slower arriving tube wave which will arrive after the time for the mud wave arrival. This mud wave arrival is, of course, a direct wave that travels with approximately the velocity of water or 5,000 feet per second. Also, the gate circuit if one desires to look only for the shear wave, may be adjusted to cut off at a time equal to approximately 1.7 times the compressional wave arrival time. Furthermore, it is of course possible to use the method and instrumentation described in FIGURE 4 in various combinations with the gain changing method of FIGURE 1.

Referring now to FIGURE 6 the wave form trace A, it should be noted that this trace corresponds to signals received from the farthermost of two receivers plus the beginning of the compressional wave signal from the nearer receiver. The signal from the nearer of two receivers is normally used in combination with signals from the farthermost receiver for making the compressional wave velocity survey. Thus in FIGURE 6 the wave form of trace A shows at 80 and at corresponding places on the other traces the presence of the switched off signal from the nearer of the two receivers. Following the switched off near receiver signal, there arrive at the surface a switched off compressional wave signal 113 from the farthermost receiver and a shear wave signal 112 from the farthermost receiver. Referring now to FIGURE 5 and the wave form traces of FIGURE 6, there is shown diagrammatically the circuitry required to be incorporated into the oscilloscope 33 of FIGURE 1 to modify the received signal in such a way that it may be recorded in a very convenient form.

The circuitry illustrated in FIGURE 5 has its output, taken from the cathodes of diodes 110 and 111, applied to the beam brightness control grid of the cathode ray tube of cathode ray oscilloscope 33 of FIGURE 1, and its input, applied through a capacitor to the grid of triode 90, connected to conductor pair 42 of FIGURE 1. In using the circuitry of FIGURE 5, the beam brightness control grid of cathode ray oscilloscope 33 of FIGURE 1 is biased so that the beam is normally extinguished except as turned on by pulses from the circuitry of FIGURE 5 as described below. Also, when the circuitry of FIGURE 5 is used the vertical beam deflection circuits of cathode ray oscilloscope 33 are disabled. However, the horizontal deflection circuits and the sweep and synch circuits 31 are left unmodified and are caused to operate in the normal manner as described above. The nature of this convenient form of recording results in the production of a record in which the depth scale may be for example along a vertical direction on the record, while both arrival time and amplitude may be recorded along a horizontal axis. The record trace at any discrete depth consists of horizontal line segments. One edge of each segment defines the instant of arrival or production of a signal, and the horizontal extent of each segment defines the corresponding amplitude of the signal. Thus, for example at I in FIGURE 6 we see one form of this continuous record that may be produced. The record I may be a piece of film 4 inches wide and having on its right-hand side depth numbers showing the depth at which various portions of the record are produced. At the left-hand part of the trace we see a vertical row of dots which are made up of rather wide dots or dashed immediately followed by a vertical row of dots. These two vertical rows of dots represent the arrival times of transmitter transients and following this double row of dots to the right are another double row of dots which define a wiggly line or a pair of wiggly lines. The left row corresponds to the varying arrival times of the first compressional waves at the nearer of two receivers and the right-hand row of dots is horizontally spaced from the arrival time row by varying distances proportional to the amplitude of the arriving signal. Thus, we see for this pair of wiggly lines that the arrival time of the signals at the first receiver varies but that the amplitude remains relatively constant. This applies also for the third double row of dots which make up a third pair of wiggly lines on the record I. In the right-hand portion of record I the sixth row of dots defines the arrival time of the shear wave and to the right of this the seventh row of dots, which is not spaced a constant distance from the arrival time dots, shows that the amplitude of the shear wave varies in a way different from that of its arrival time.

Now looking at record J of FIGURE 6, we have a record that is almost identical in its method of production with record I. The only difference being that in record J the region between the corresponding dots of a particular record are joined together by a line so that instead of having a pair of dots representing a signal with a certain arrival time and a certain amplitude there is shown a horizontal line, the left-hand edge of which represents the arrival time of the particular wave and the width of which represents the amplitude of that wave. The purpose of making records of this type is that they serve essentially the same purpose as would be obtained if one simply applies the signals of FIGURE 1 to the control grid of the cathode ray tube thereby producing a variable density record which would show in detail slight variations in amplitude and/or velocity of the received wave. The improvement in the form of variable line width or variable dot separation recording shown in records I and J is that there is no critical precaution needed in the exposure and developing process since the record may be exposed and developed to full density in every case without losing detail. Furthermore, as regards to record I this is produced by application of wave forms as shown in wave form H to the control grid of the cathode ray oscilloscope, whereas record J is produced by application to the control grid of the cathode ray oscilloscope of the wave form shown at G.

Referring again to FIGURE 5, there is shown the circuitry needed for the production of the wave forms shown in FIGURE 6. In the following it should be noted that the wave form traces of FIGURE 6 are not drawn exactly to scale although corresponding phases of the signals are aligned. The signals illustrated by the wave form A from the downhole tool, are passed through the vacuum tube amplifier 90 and amplified, with the amplified signals appearing as shown in the trace B of FIGURE 6. To simplify the schematic diagram of FIGURE 5 but a single stage of amplification is shown preceding the clipping diodes 91 and 92. However, where long well logging cables are used additional stages will be required to bring the signals up to the clipping level of the diode clipping circuit and to preserve the polarities indicated in FIGURE 6, in which figure the directions corresponding to positive going electrical pulses are up while negative pulses are down. Furthermore, the ratio of the amplified to the unamplified signals will normally be greater than the two to one ratio approximately indicated at A and B in FIGURE 6, the small ratio having been chosen for illustrative purposes to conserve space in FIGURE 6. This amplified signal is then passed through a clipping circuit formed by a pair of zener diodes 91 and 92 connected in the plate circuit of triode 90. The signal after clipping will have a wave form as at C. The clipped signal is then passed through a second vacuum tube amplifier 93 to produce at its plate pulses constituting an amplified and clipped form of the input wave form applied to the grid of vacuum tube 90. This amplified and clipped wave form will exhibit polarities opposite those of wave form C, and is not illustrated in FIGURE 6. The amplified and clipped wave is then differentiated by means of the RC circuit comprising resistor 94 and resistor 95. The differentiated signal is then transmitted through cathode follower 96 which is biased to cut off. Thus there are produced on the cathode of triode 96 positive going pulses, as at trace D in FIGURE 6, across a very low output impedance. These pulses respectively are proportional to the corresponding time derivatives of the leading edges of the positive half cycles of the input wave form as they go through zero or transition points. From the cathode of triode 96 these positive going pulses are transmitted through the diode 97 shown in the circuit and substantially instantaneously charge the capacitor 100 to a voltage proportional to the amplitude of the differentiated wave form. This voltage is then retained by the capacitor until it is subsequently discharged by the transistor 101 shown in the circuit. The transistor 101 shown in the circuit is of the NPN type and it is normally biased to cut off so it will not pass current. However, when a positive pulse is produced at the cathode of triode 96 it is further differentiated by the RC circuit connected to the base of transistor 101 to produce spikes as at E in FIGURE 6. The positive spikes cause the transistor 101 to very rapidly discharge the condenser 100 reducing its voltage substantially to zero. Thus, we see that when a pulse produced by differentiation of the amplified receiver signal is produced at the cathode of the third vacuum tube amplifier 96, it does two things in sequence. First, it applies a very sharp positive spike to the base of the transistor 101 thus discharging capacitor 100 to a low value, and subsequently it recharges the capacitor 100 through the diode 97 to a voltage proportional to the amplitude of the pulse produced by differentiation. Thus capacitor 100 is at all times charged to a voltage which is proportional to the amplitude of the pulse produced by differentiation of the preceding wave form.

As a result of the above-described circuit there is produced at the capacitor 100 a wave form such as shown at F which is called a stair step wave form though it is not quite a true step wave there being times between the individual square steps at which the amplitude of this voltage is reduced to zero or a low value as shown in wave form F. The peak voltage that is built up across capacitor 100 is then applied through the vacuum tube amplifier 102 that constitutes a cathode follower to the first grid of the delay multivibrator 103 through a resistor and capacitor circuit which partially differentiates the stair step wave form. The multivibrator 103 comprises the last two vacuum tubes 104 and 105. It should be noted here that it may be desirable to provide additional amplification in the stair step generator circuit described above and the cathode follower circuits, however, this is omitted for the sake of simplifying the diagram. Thus, we have applied to the first grid of the delay multivibrator a varying voltage the amplitude of which in any instance is proportional to the peak voltage of the preceding wave form and consequently proportional to its amplitude. The four vacuum tubes 90, 93, 96 and 102 generate a stair step voltage wave form that controls the period of multivibrator made up of the two triodes 104 and 105. Moreover partial differentiation of the stair step wave form, which occurs at the grid of vacuum tube 104, results in a narrow spike which triggers the multivibrator 103. For the duration of the triggered condition the multivibrator is controlled by the magnitude of the stair step voltage wave form appearing on the cathode of the cathode follower 102 which in turn is a function of the slope of the preceding leading edge of the clipped wave form. Thus, we have produced as the output of the delay multivibrator 103 the wave form shown at G. This consists of positive square waves or they may be by differentiation and rectification converted to the wave form H. This differentiation and rectification may be produced by capacitor resistance combination 106, 107, 108 and 109 and diodes 110 and 111. Resistor 106 is made somewhat larger than the resistor 107 so that the duration of the differentiated wave form for the leading edge of the square wave will be greater than for the trailing edge, thus resulting in the beam of the cathode ray tube being turned on longer for the leading edge than the trailing edge to produce a heavy trace to indicate the arrival time and a light trace in record I to indicate the amplitude of the received wave.

In a similar manner the wave form shown at G may be used to control the beam of a cathode ray tube to produce the record shown in J. The width of the pulses appearing in the wave form G are related to the amplitude of the signals and thus the width of the variable area record shown in J is related to the amplitude of the signals. In addition, the displacement of the signals from the left of the record is related to the velocity of the waves that generated the original signals.

From the above description of a preferred embodiment of this invention it can be appreciated that a system has been provided whereby the signals resulting from both compressional and shear waves may be recorded simultaneously. As seen in record J of FIGURE 6, the signals resulting from the shear waves are recorded in a form that permits one to inspect both the velocity of the shear wave as well as its amplitude. The record J also records the signals resulting from the compressional waves and signals resulting from slower arriving waves. The record J is also easily interpreted as a result of the variable area presentation, thus one may easily determine the amplitude as well as the velocity of the shear waves and other slow waves.

The apparatus described above may be used in many alternate ways to obtain recordings of different waves. For example, with low pass filter 77 out of the circuit and the gate amplifier 78 disabled so that it continuously transmits signals the surface instruments will receive a signal illustrated by trace A of FIGURE 6. In contrast with low pass filter 77 in the circuit the compression and shear wave signals will be attenuated and only the tube wave signal of the record receiver will be received at the surface.

In another mode of operation the inputs to the downhole amplifiers 21 and 71 can be reduced by a factor of 30 by a switch means not shown. Under these conditions the signal received at the surface will be similar to trace A of FIGURE 6, but the deflections corresponding to 80 and 112 will be produced by the shear wave and tube wave, respectively. The shear wave velocity may be recorded as a two receiver velocity log by the strip chart instrumentation 34 and the tube wave could be recorded on a separate strip chart recorder as a single receiver log to provide a record of shear and tube waves to the exclusion of compressional waves. Of course, the shear and tube waves could also be recorded oscillographically or by recording the amplitude of the waves on a recording voltmeter.

In addition to the above, the gate circuit 78 can be adjusted to switch off for a desired time interval so that there is transmitted to the recording instrumentation only the shear or tube waves as desired. The instrumentation would then produce only a record of the desired wave.

From the above-described methods, it is apparent that this invention will produce records of various combinations of compressional, shear and tube waves as desired. These records will reveal the transmission properties of earth formations surrounding a borehole as well as transmission properties of the fluid-filled borehole, pipe in the borehole and cement used for setting the pipe. In addition, the records will indicate reflections produced by layering of the formation or discontinuities in the pipe or cement.

The apparatus described provides a novel method for logging boreholes and for correlatably recording several types of information from the same borehole, and for recording several types of information during a single traverse of the borehole. In addition, there is provided selective recording of several types of acoustic waves produced in borehole. The apparatus produces one wave form for each positive half cycle of the input wave although the negative half cycle could also be used. The duration of the produced signals is proportional to the slopes or time derivatives of the input wave form where the wave form has a near zero amplitude and goes through its transition points at zero level. Thus, the output wave form has a duration proportional to a desired quantity of the input wave form and is recorded by a novel system.

The output wave forms constitute a novel translation of signal information in which the output signals have a duration proportional to a desired quantity and in which there is produced only one wave form for each fluctuation of the input wave. The output wave is utilized in a recording method that displays time and amplitude by deflection distances along one axis of a recording medium and that displays depth or any other desired quantity along another axis. For example, the second axis may conveniently be perpendicular to the first. It is of course obvious that negative rather than positive half cycles may be recorded by slight modification of the circuitry, and indeed, the circuitry is readily adaptable to recording both positive and negative half cycles by inclusion of a full wave rectifier ahead of the clipping circuit.

I claim as my invention:

1. A method of acoustically logging a borehole to obtain a record of the velocity of compression waves through formations surrounding the borehole and a record of slower arriving waves, said method comprising:

generating an acoustical impulse at a point within the borehole;

receiving the waves resulting from said acoustical impulse at a point spaced from the point of generation and converting the received waves to a related electrical signal;

transmitting the first portion of said electrical signal at a high amplification to a recording system, then transmitting the remainder of said electrical signal resulting from said acoustical impulse at a low amplification to said recording system; and individually recording both the low amplitude signal and the large amplitude signal in a correlatable manner.

2. A method of acoustically logging a borehole to obtain a record of the velocity of compression waves through formations surrounding the borehole and a record of slower arriving waves, said method comprising:

generating an acoustical impulse at a point within the borehole;

receiving the waves resulting from said acoustical impulse at a point spaced from the point of generation and converting the received waves to a related electrical signal;

amplifying said electrical signal at a relatively high gain during its first few half cycles only and at a relatively low gain during the remainder of the signal to impart generally similar amplitudes to the cycles which are proportional to the compressional acoustic waves and the later arriving acoustic waves;

transmitting said electrical signal to a recording station;

converting said electrical signal to a train of pulses whose duration is related to the time derivative of the various portions of the electrical signals corresponding to the various waves generated by the acoustical impulse and whose occurrence corresponds to the receiving of these waves at the point spaced from the point of generation;

controlling the beam of an oscilloscope with said train of pulses while rendering the horizontal sweep of said oscilloscope operative and the vertical sweep of said oscilloscope inoperative;

and recording on a photographic film the image appearing on said oscilloscope.

3. A method of acoustically logging a bore hole, which comprises:

generating an acoustic impulse within the borehole;

receiving waves resulting from said acoustical impulse at a point spaced from the point of generation and converting the received waves to a related electrical signal;

transmitting said electrical signal to a recording station;

converting said transmitted signal to time-related pulses, each pulse having a duration proportional to the slope of a cycle of said transmitted signal where the cycle has a near zero amplitude and goes through a transition point at zero level; and recording indications of the times of occurrences and durations of said time-related electric pulses along the same axis of a recording medium.

References Cited by the Examiner

UNITED STATES PATENTS

| | | | |
|---|---|---|---|
| 2,233,992 | 3/1941 | Wyckoff | 181—.5 |
| 2,651,027 | 9/1953 | Vogel | 340—18 |
| 2,968,724 | 1/1961 | Clark | 340—18 |
| 2,974,303 | 3/1961 | Dixon | 340—18 |
| 3,071,203 | 1/1963 | Savage et al. | 340—18 |
| 3,102,251 | 8/1963 | Blizard | 340—18 |

BENJAMIN A. BORCHELT, *Primary Examiner.*

SAMUEL FEINBERG, KATHLEEN H. CLAFFY,
*Examiners.*